March 15, 1927.  C. E. CARPENTER  1,621,234
TOASTING MACHINE AND THE LIKE
Filed Oct. 29, 1925  4 Sheets-Sheet 1

Inventor
Charles E. Carpenter

March 15, 1927.  1,621,234
C. E. CARPENTER
TOASTING MACHINE AND THE LIKE
Filed Oct. 29, 1925     4 Sheets-Sheet 2
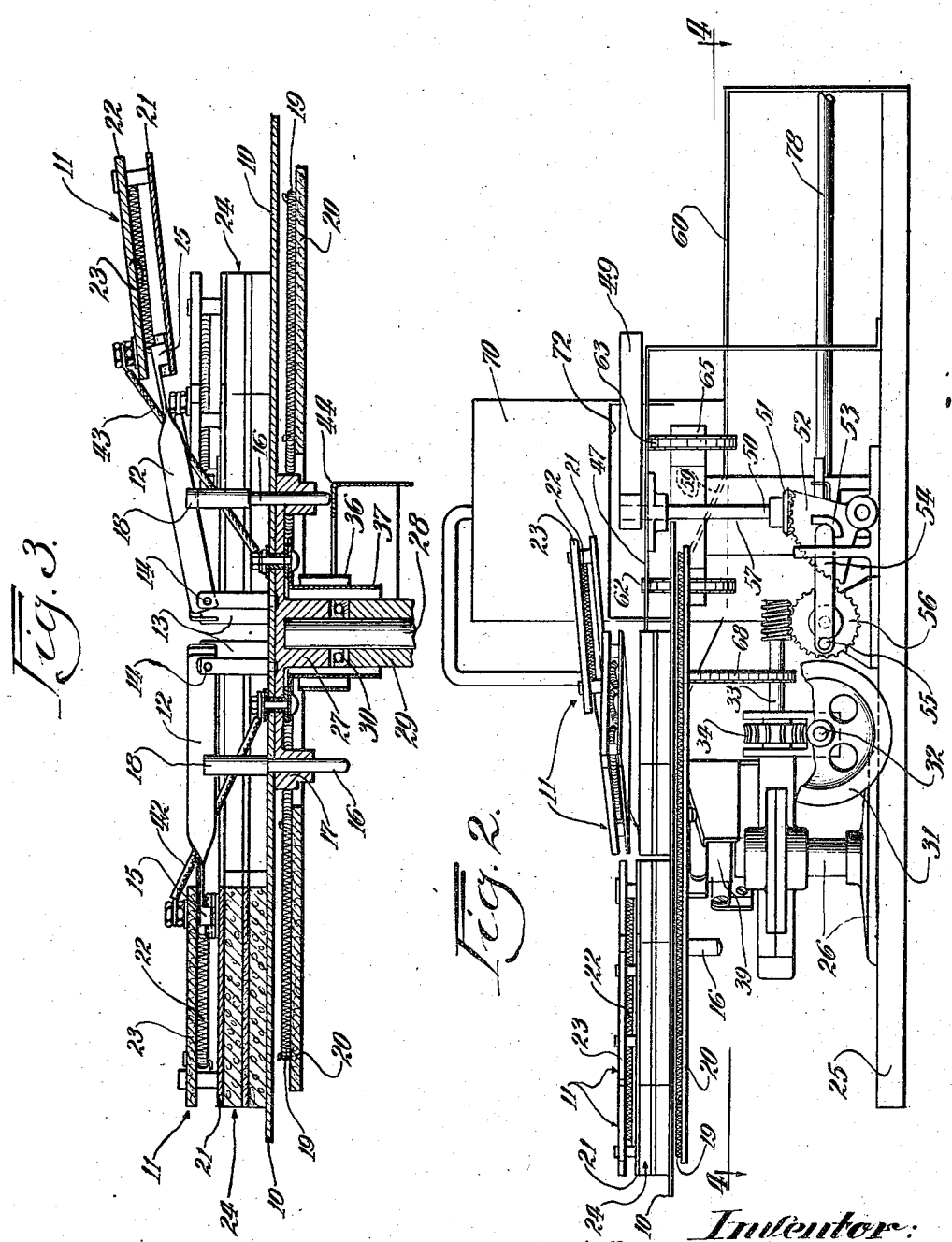
*Inventor:*
*Charles E. Carpenter*

March 15, 1927. 1,621,234
C. E. CARPENTER
TOASTING MACHINE AND THE LIKE
Filed Oct. 29, 1925   4 Sheets-Sheet 3

Inventor:
Charles E. Carpenter

March 15, 1927. 1,621,234
C. E. CARPENTER
TOASTING MACHINE AND THE LIKE
Filed Oct. 29, 1925 4 Sheets-Sheet 4

Inventor:
Charles E. Carpenter

Patented Mar. 15, 1927.

1,621,234

UNITED STATES PATENT OFFICE.

CHARLES E. CARPENTER, OF CHICAGO, ILLINOIS.

TOASTING MACHINE AND THE LIKE.

Application filed October 29, 1925. Serial No. 65,519.

This invention has to do with an improved machine for toasting food. The invention has reference particularly to improvements in machines for simultaneously toasting both sides of the article to be toasted.

One feature of the invention relates to the provision of a machine for automatically and continuously toasting the objects, said objects being fed into the toasting machine proper automatically and in regular sequence without particular thought on the part of the operator.

One feature of the invention relates to the provision of means for ensuring proper toasting action on articles of varying thickness, thus ensuring a proper and satisfactory toasting operation regardless of the usual inequalities in the thickness of slices of bread, etc.

Another object of the invention is to provide automatic means for buttering the articles on one or both sides before they are passed into the toasting machine proper, so that they will be given a particularly palatable and agreeable taste due to toasting of the articles already buttered.

More particularly it is intended to provide a machine for toasting sandwiches and the like, so that the flavor of the meat or other intermediate layer will be cooked into the slices of bread and thus impart an exceptionally delicious and palatable taste to the completed article.

In connection with the above, it is a further object to provide mechanism for automatically feeding the individual sandwiches into place without danger of separating their several layers from each other, notwithstanding the fact that the sandwiches will be of irregular and uneven thickness.

Another object of the invention is to provide a power driven machine which may continue to function for an indefinite length of time, the only requirement being that the machine shall be continuously supplied with the articles to be toasted, such as sandwiches, slices of bread, etc.

Other objects and uses of the invention will appear from a detailed description of the same, which consists in the features of construction and combinations of parts hereinafter described and claimed.

In the drawings:

Fig. 2 shows a side view of the machine looking in the direction of the arrows 2—2 in Fig. 1;

Fig. 3 shows a vertical section through the rotating platform, being taken on the line 3—3 of Fig. 1, looking in the direction of the arrows, but on enlarged scale;

Figure 1:
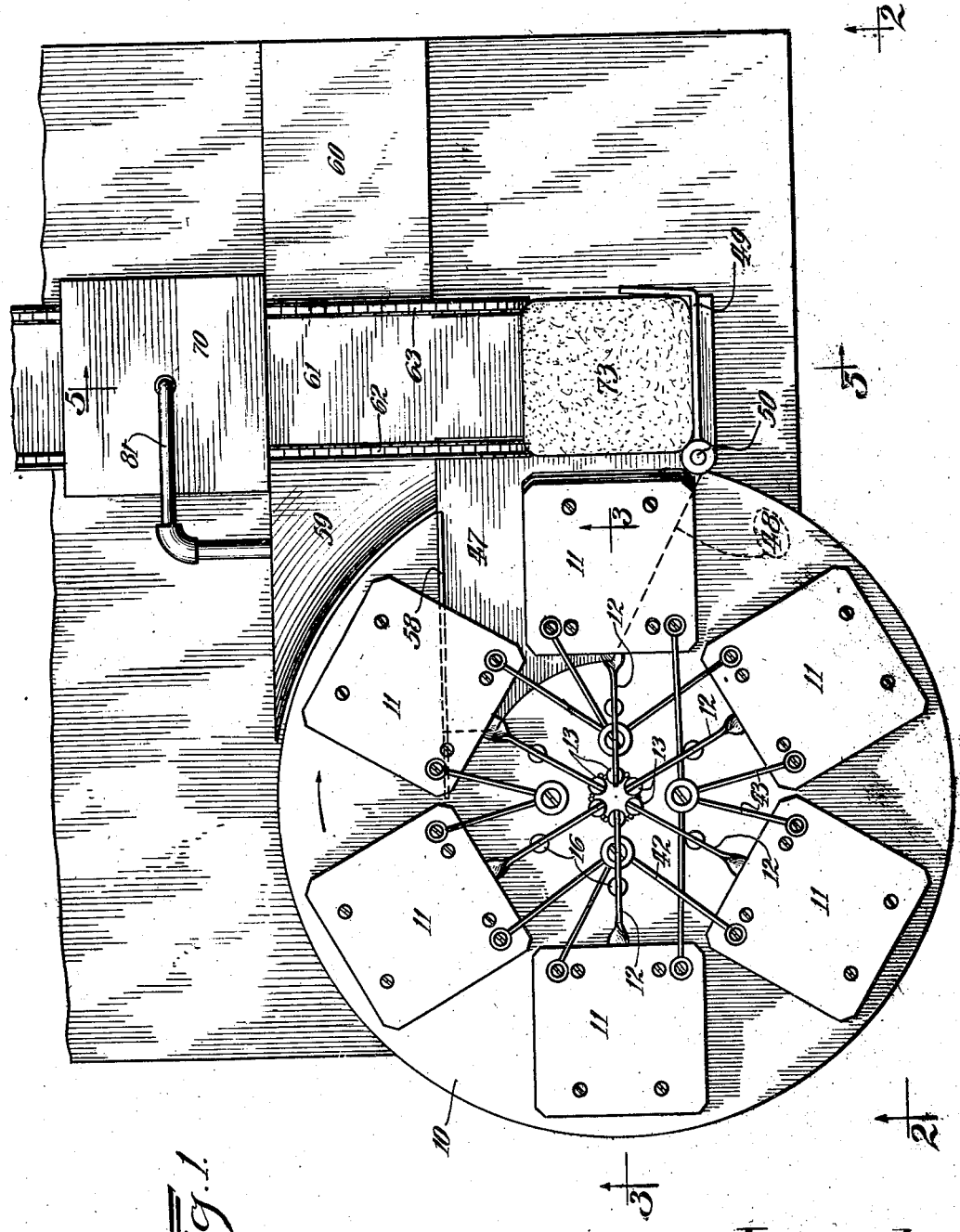
Figure 1 shows a plan view of a machine embodying the features of the present invention, a slice of bread or sandwich standing in place ready to be delivered into the toasting machine.

The machine includes primarily a circular table 10 which is pivotally mounted, so that it can rotate about a vertical axis, in conjunction with a series of heating paddles 11 located above said table and turning with it. Each of these paddles is heated; and the individual paddles are carried by radial arms 12 which are pivoted to the table proper at their inner ends and adjacent to the axis of rotation. These pivotal points are conveniently established by means of a series of posts 13, (see Fig. 3), the upper ends of which are slotted to receive the arms 12 which are pivoted therein by the pins 14.

The paddles 11 are preferably loosely mounted on the ends of their respective arms 12, so that the individual paddles may rock about said arms, but when the arms are raised, the paddles are likewise raised away from the table 10. This result is conveniently accomplished by the provision of a radially extending pivotal connection 15 between the outer end of each of the arms 12 and the inner edge of the corresponding paddle, as clearly evident from Fig. 3. These pivotal connections are also rather loosely made, so that the various paddles can rock up and down with respect to the arms 12 as well as rocking sidewise, but the amount of the up and down rocking movement is rather limited, so that when the arms 12 are raised, the paddles are likewise raised, as shown at the right hand side of Fig. 3.

Beneath the central portion of each of the arms 12 is a vertical pin 16, the same being slidably mounted in a suitable socket 17 of the table. The upper end 18 of each of these pins is slotted to receive the central portion of the arm 12, so that by raising the pin, the arm is raised, as shown at the right hand side of Fig. 3. This will also result in raising the corresponding paddle. The pins 16 are shouldered so as to limit their downward movement, so that they will not drop away from the table.

The table itself is heated around its entire body by a suitable electric heating element 19, and preferably this heating element is protected on its bottom side by a circular layer of asbestos or the like 20. Each of the paddles preferably comprises a bottom metal plate 21 which is heated by an electric heating element 22, said heating element in turn being protected by an asbestos block or the like 23. Consequently, the table 10 is heated all over its surface, and each of the paddles is heated on its bottom surface. As a result, articles 24, such as sandwiches and the like, placed between the respective paddles and the table will be toasted on both sides.

As the table rotates, the successive paddles are raised into a position such as shown at the right hand side of Fig. 3, so as to allow a new article to be moved into place on the table and beneath the paddle. The rotation of the table then continues and after a short distance of travel, the paddle is again lowered, so that it rests on the top of the sandwich. The rotation of the table then continues until the toasting sandwich reaches a point close to the position where it was introduced, whereupon it is removed and the paddle is raised so as to admit introduction of another sandwich. In this way, the operation is continuous and there are always a number of sandwiches being toasted.

As a matter of structural convenience, the parts already referred to are supported with respect to the base plate 25. A standard 26 is located on this base plate, the table 10 being provided with a central downwardly reaching post 27 into which extends a shaft 28, said shaft being journaled in a bearing 29 which is carried by the pedestal 26. A ball or roller bearing 30 is preferably placed between the post 27 and the bearing 29 so as to carry the weight of the table and supported parts with a minimum of friction.

Figure 4:
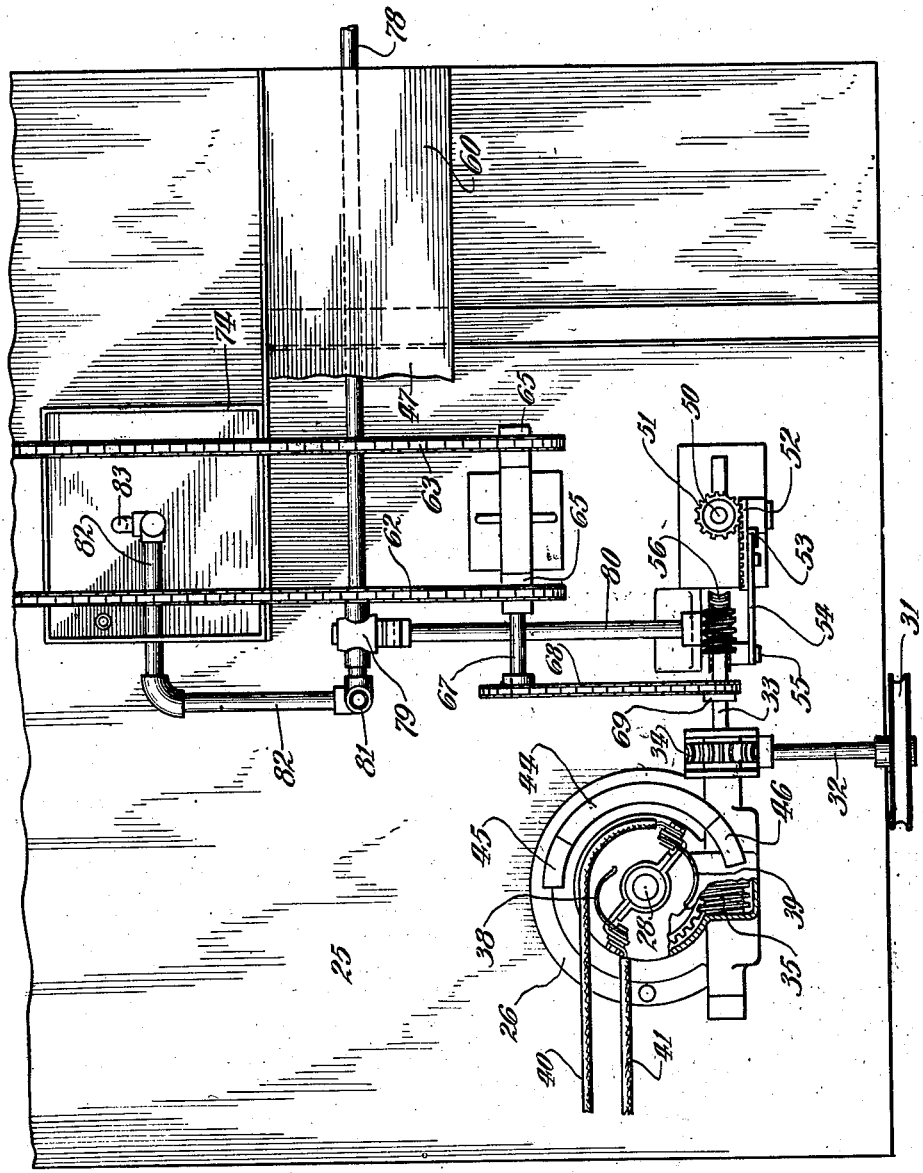
Fig. 4 shows a plan view of the base plate and operating mechanism, being taken substantially on the line 4—4 of Fig. 2, looking in the direction of the arrows.
Figure 5:
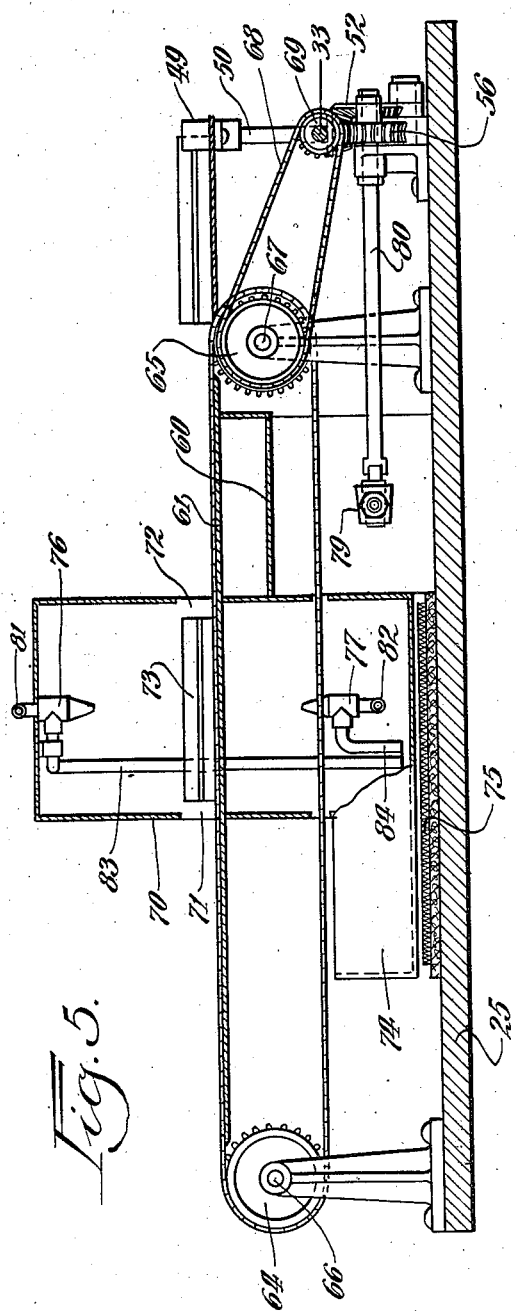
Fig. 5 shows a side elevation of the carrier mechanism, being taken on the line 5—5 of Fig. 1, looking in the direction of the arrows, but on enlarged scale.

A shaft 28 is conveniently driven by an electric motor belted to a pulley 31, which pulley is on a shaft 32 driving a shaft 33 at right angles thereto through the medium of a worm gear connection 34. This shaft 33 drives the shaft 28, already referred to, through a worm gear connection 35 (see Fig. 4).

Any suitable means may be provided for ensuring a proper supply of electricity to the heating coils of the table and the individual paddles. In the particular construction illustrated, I have provided a pair of slip rings 36 and 37 carried by and rotating with the table for the two sides of the electric circuit. Corresponding brushes 38 and 39 are mounted on a stationary part composed of insulating material in position to engage the slip rings when the table is in place. These brushes are supplied with current through the leads 40 and 41.

The heating coils of the individual paddles are likewise connected to the slip rings 36 and 37 by the pairs of wires 42 and 43, as indicated in Fig. 1. As a consequence, the table and paddles are properly heated at all times.

Beneath the table there is located a stationary curved cam 44, the ends 45 and 46 of which are properly beveled. This cam is placed beneath the circular path of travel of the pins 16 and serves to ensure successive temporary lift of said pins as the table rotates. The cam 44 is properly placed and of proper size to ensure lift of the paddles at the desired time in the sequence of movements.

Reaching over the surface of the table at the point of sandwich introduction is a shelf 47, the position of which appears best from examination and comparison of Figs. 1 and 2. This shelf is placed only slightly above the surface of the table, and is relatively narrow as compared to the circumference of the table. The sandwiches are introduced directly upon the shelf 47 and from thence they are slid down over the edge 48 of said shelf and onto the top surface of the table.

For this purpose, I have provided an angular arm 49 swinging over the surface of the shelf 47 and mounted upon the upper end of a vertical shaft 50. Said shaft has at its lower end a gear 51 meshing with a curved rack 52. This rack has on its side face of a cam shaped lug 53 which may be engaged by a horizontally rocking arm 54. Said arm is in turn pivoted at the point 55 to a gear wheel 56 which is driven from the shaft 33, already referred to. A spring tends to restore the shaft 50 and arm 49 to the position illustrated in Figs. 1 and 2. As the gear wheel 56 rotates, the arm 54 is forced to the right in Fig. 2, thus rocking the segmental gear 52 and turning the shaft 50 and swinging the arm 49 rapidly around so as to sweep the sandwich over the edge 48 of the shelf 47 and down onto the table.

At the extreme movement of the arm 54, as just explained, the end of said arm will slide up over the cam shaped lug 53 so as to allow the spring 57 to quickly restore the shaft 50 and arm 49 to the original position.

At the other side of the shelf 47 there is provided a vertical flange 58 against which the fully toasted sandwiches will contact as the table rotates, so that said sandwiches will be forced out and over the edge of the table. Upon doing so, they will slide down over the adjoining edge portion 59 of a chute 60 onto which they are delivered. It will be understood that each of the paddles 11 is raised as the sandwich runs against the flange 58, and remains in the raised position until after the new sandwich has been moved into place over the edge 48 of the shelf 47.

Extending across the machine above the position of the chute 60 is a horizontal table 61 at the same level as the shelf 47. One or more carriers 62 and 63 are arranged to travel along the edges of this shelf 61, said carriers in turn passing over sprocket wheels 64 and 65 located on shafts 66 and 67 at the ends of the shelf 61. Said shaft 67 is in turn driven by a chain 68 running over a sprocket 69 on the shaft 33, already referred to.

Around the central portion of the table 61 and carriers 62 and 63 is a housing 70. The same has the slotted openings 71 and 72 at its two sides through which the sandwich 73 carried by the chains 62 and 63 may travel. Beneath this housing is a pan 74 preferably heated by an electric heater 75, which pan contains a suitable supply of butter in molten condition. Within the housing at positions above and below the sandwich 73 are the spray nozzles 76 and 77. These are directed towards the top and bottom surfaces of the sandwiches. A supply of compressed air is available through the line 78 which passes to a rotary valve 79. Said valve is periodically turned by a shaft 80 also driven from the shaft 33. Leading from the valve 79 are the pipes 81 and 82 for the spray nozzles 76 and 77, respectively, so that each time the valve is opened compressed air is admitted to both of the spray nozzles. These nozzles also connect with the lower portion of the pan 79 by the pipes 83 and 84, so that whenever compressed air is admitted to the nozzles, the liquid butter is syphoned up and sprayed against the top and bottom surfaces of the sandwich.

It will, of course, be understood that the gear ratios between the different parts should be such as to ensure proper timing of the different operations. This timing should be such that as each sandwich passes between the nozzles 76 and 77, the valve 79 is opened to ensure spraying their surfaces with butter, should be such that as each paddle 11 comes into the general position, indicated in Fig. 1, the arm 49 will be swung around to move the sandwich into place on the table and beneath the paddle, and the movements of the chain conveyor should be such as to ensure delivery of the sandwiches against the arm 49 prior to the swinging of said arm, as already explained.

It will be noted that the delivery movement of each sandwich from the rotating table is occasioned by contact with the plate 58. The removal of the sandwich will necessarily be gradual and not instantaneous. If it should be found in some cases that this results in an excessive amount of toasting action on the edge which leaves the table last, it might be desirable to employ an automatic sweep arm for removing the sandwiches and operating in a manner similar to the arm 49. I, therefore, contemplate the use of such a structure located adjacent to the discharge position.

While I have herein shown and described only a single embodiment of the feature of my present invention, still I do not intend to limit myself to the same, except as I may do so in the claims.

I claim:

1. In a machine of the class described, the combination of a table mounted for rotation about a central vertical axis, means for heating said table, a series of paddles above the table, a radial arm for each paddle, a pivotal connection between the inner end of each arm and the central portion of the table permitting vertical swinging movement of the arm within a vertical radially extending plane, a pivotal connection between the outer end of each arm and its paddle permitting lateral rocking movement of the paddle with respect to the arm, together with a limited amount of rocking movement of the paddle about a transverse axis with respect to the arm, means for heating the individual paddles, a stationary shelf overlying one portion of the table and in close proximity thereto, a supply chute leading to said shelf, suitable carriers in conjunction with the supply chute for the transfer of articles along the same, spray nozzles above and below the carriers adapted to spray articles carried thereby, means for continuously rotating the table, means for successively raising the paddle arms as the paddles pass the position of the shelf and for thereafter permitting lowering of said arms, means for successively transferring articles from the carrier across the shelf onto the table beneath the paddles prior to said paddle lowering movement, and means for successively operating the spray devices in timed relationship, substantially as described.

2. In a machine of the class described, the combination of a table mounted for rotation about a central vertical axis, means for heating said table, a series of paddles above the table, a radial arm for each paddle, a pivotal connection between the inner end of each arm and the central portion of the table permitting vertical swinging movement of the arm within a vertical radially extending plane, a pivotal connection between the outer end of each arm and its paddle permitting lateral rocking movement of the paddle with respect to the arm, together with a limited amount of rocking movement of the paddle about a transverse axis with respect to the arm, means for heating the individual paddles, a stationary shelf overlying one portion of the table and in close proximity thereto, a supply chute leading to said shelf, suitable carriers in conjunction with the supply chute for the transfer of articles along the same, spray nozzles above and below the carriers adapted to spray articles carried thereby, means for continuously rotating the table, means for successively raising the paddle arms as the paddles pass the position of the shelf and for thereafter permitting lowering of said arms, and means for successively transferring articles from the carrier across the shelf onto the table beneath the paddles prior to said paddle lowering movement, substantially as described.

3. In a machine of the class described, the combination of a table mounted for rotation about a central vertical axis, means for heating said table, a series of paddles above the table, a radial arm for each paddle, pivotal connections between the ends of said arms and the table and paddle respectively, means for heating the individual paddles, a stationary shelf overlying one portion of the table and in close proximity thereto, a supply chute leading to said shelf, suitable carriers in conjunction with the supply chute for the transfer of articles along the same, spray nozzles above and below the carriers adapted to spray articles carried thereby, means for continuously rotating the table, means for successively raising the paddle arms as the paddles pass the position of the shelf and for thereafter permitting lowering of said arms, and means for successively transferring articles from the carrier across the shelf onto the table beneath the paddles prior to said paddle lowering movement, substantially as described.

4. In a machine of the class described, the combination of a table mounted for rotation about a central vertical axis, means for heating said table, a series of paddles above the table, means for causing said paddles to travel with the table while permitting the individual paddles to move vertically with respect to the table, means for heating the individual paddles, a stationary shelf adjacent to one portion of the table, means for delivering articles across said shelf and onto the table in timed relationship with respect to table rotation, and means for successively raising the paddles as they pass the delivery position aforesaid, substantially as described.

5. In a machine of the class described, the combination of a smooth plane table mounted for rotation about a central vertical axis, means for heating said table, a series of flat paddles above the table, said paddles being entirely plane throughout their areas, means for causing said paddles to travel with the table while permitting the individual paddles to move vertically with respect to the table, means for heating the individual paddles, means for delivering articles edge-wise onto the smooth table in timed relationship with respect to the table rotation, and means for successively raising the paddles at the position of said delivery, substantially as described.

6. In a machine of the class described, the combination of a smooth plane table mounted for rotation about a central vertical axis, means for heating said table, a series of flat paddles above the table, said paddles being entirely plane throughout their working surfaces, means for causing said paddles to travel with the table while permitting the individual paddles to move vertically with respect to the table, means for heating the individual paddles, and means for delivering articles side-wise onto the smooth table and beneath the paddles in timed relationship with respect to the table rotation, substantially as described.

7. In a machine of the class described, the combination of a table mounted for rotation about a central vertical axis, means for heating the table, a series of paddles traveling with and vertically movable with respect to the table, means for introducing individual articles onto the table beneath the paddles in timed relationship with respect to the table rotation, and means for spraying said articles prior thereto, substantially as described.

8. In a machine of the class described, the combination of a smooth plane carrier surface, means for heating the same, a series of flat paddles traveling with said carrier surface and movable vertically with respect to the same, said paddles being plane throughout their working surfaces, means for heating the individual paddles, and means for introducing articles to be treated edge-wise between the carrier surface and the individual paddles in timed relationship with respect to the carrier travel, substantially as described.

CHARLES E. CARPENTER.